Patented July 21, 1942

2,290,435

UNITED STATES PATENT OFFICE 2,290,435

QUINHYDRONES FROM VAT DYESTUFFS AND PROCESS OF MAKING SAME

Eduard Kambli, Basel, Ernst Stoecklin, Binningen, and Richard Tobler, Riehen, Switzerland, assignors to the firm of Society of Chemical Industry in Basle, Basel, Switzerland No Drawing. Application December 5, 1938, Serial No. 244,130. In Switzerland December 6, 1937

3 Claims. (Cl. 260—331)

It is known that benzoquinone as well as various other quinones of simple composition can be converted into quinhydrones. These quinhydrones are for the most part to be regarded as molecular compounds of the quinone and the corresponding hydroquinone, that is to say quinone in which both keto-groups have been reduced to hydroxyl groups. These quinhydrones may be obtained, for example, by causing a quinone to react with a hydroquinone, in many cases also by partial reduction of the quinone or partial oxidation of the hydroquinone, that is to say in general by partial change of the stage of oxidation of the one constituent in the quinhydrone. It has also been suggested that quinhydrones are not molecular compounds but intermediate stages in mono-molecular form between the compound containing at least two keto-groups and that compound in which the keto-groups are reduced to hydroxyl groups. Whatever the view as to the constitution of the quinhydrones, the possibilities for making them remain the same.

This invention relates to the manufacture of new and valuable quinhydrones from quinones in an analogous manner by using vat dyestuffs as quinones. By the process of the invention quinhydrone-like compounds of vat dyestuffs are made by causing vat dyestuffs to act upon leuco-compounds of vat dyestuffs or by partially reducing vat dyestuffs or partially oxidizing leuco-vat dyestuffs. It may be assumed in this connection that intermediately the one component is formed from the other and thereupon enters into reaction with the latter.

As vat dyestuffs which may be converted into quinhydrones by this invention there come first into question those which contain at least two keto-groups, for instance indigoid vat dyestuffs and anthraquinone dyestuffs. By vat dyestuffs are here meant the generally usual dyestuffs which dye in the vat in a commercially practicable way.

Among the vat dyestuffs which are suitable may be named from among the bis-indolindigoids, indolthionaphthene-indigoids, bis-thionaphthene-indigoids and naphthalene-indol-indigoids, especially those which have one, and preferably more, substituents, which term here includes fused-on rings as in, for instance, 4:5:4′:5′ - dibenzothioindigo (=2:1:2′:1′ - naphthothioindigo). Among the anthraquinone vat dyestuffs those are especially suitable for obtaining quinhydrones which contain substituents, for instance halogen, methoxy, amino- and substituted amino-groups and/or more highly condensed ring systems. There also come into question dyestuffs which contain besides the anthraquinone nucleus which lends the capacity for being vatted or besides a more highly condensed, if desired heterocyclic ring system of similar function, also fused-on carbazole rings or other 5-membered rings or even acridone rings as well as other heterocyclic configurations.

From these dyestuffs quinhydrones may be obtained, for example, by causing the dyestuff to act upon its leuco compound. In many cases the dyestuff may be partially reduced, that is to say may be treated with a reducing agent of insufficient quantity for complete reduction or may be treated under such conditions that complete reduction does not occur. It is advantageous to operate in aqueous medium in which by maintaining an alkaline, for instance, a caustic alkaline reaction the leuco-compound of the vat dyestuff is soluble and can act especially easily on the vat dyestuff suspended in the solution, preferably in a finely subdivided state. The occurrence of a reaction is generally to be detected by a change of colour, since the quinhydrones are differently coloured from the corresponding dyestuffs and leuco-compounds analogously to the difference in colour between benzoquinone and hydroquinone as compared with the quinhydrone formed therefrom.

In making the quinhydrones it is often necessary to adjust the temperature of reaction and the hydrogen ion concentration of the reaction medium in suitable relation to each other, since in the case of various vat dyestuffs the optimum conditions for quinhydrone formation vary considerably. As a rule it is possible to operate at a raised temperature, for example about 40–80° C., that is to say at a temperature normally used for the complete vatting of the dyestuff. In many cases, however, lower temperatures, about room temperature, or higher temperatures, for example even above 100° C. when non-aqueous solvents are used, are more advantageous. In most cases the use of aqueous alkaline media is recommended, for instance alkali hydroxides, if desired at higher or lower concentration than is usual for vatting, or even alkali carbonate or alkali sulfide solution or a solution of ammonia or organic base, for instance an alkylamine or an alkanolamine. Alternatively, however, it is possible to use organic solvents, for instance alcohol, with or without addition of water in presence or absence of an agent of alkaline action. This is especially to be recommended when, as in the case of the known substituted thio-indigos, the quinhydrone is decomposed into its components by alkalis, so that it cannot be produced in presence of alkali.

In many cases there is obtained not only a quinhydrone which contains only one dyestuff when a vat dyestuff is combined with its leuco compound, but also a mixed quinhydrone by combination of a vat dyestuff with a leuco-compound of another vat dyestuff, this especially being the case when the two dyestuffs have a similar capacity for reduction. When the choice of vat dyestuffs or their conditions of reaction has not been suitable either no reaction occurs or there is a vice versa vatting in that the leuco-compound of the one dyestuff reduces the other dyestuff to its leuco-compound and is at the same time itself oxidized to the dyestuff. On the other hand, with many dyestuffs, especially those which belong to the same group of dyestuffs and do not differ substantially in molecular weight, for instance differ only by about 50 units or less, the production of mixed quinhydrones is possible under the same conditions as in the case of quinhydrones containing only one dyestuff. Examples of this are 6:6'-diethoxy-thio-indigo, 4:4'-dimethyl-6:6'-dichloro-thio-indigo and 4:5:4:'5'-dibenzothio-indigo.

The quinhydrones made from vat dyestuffs by the process of this invention are generally precipitated in fine crystalline form; the preparation frequently exhibits under the microscope a pronounced crystalline form. They are, as already stated, in general differently or more deeply colored than are the corresponding dyestuffs. They are very sparingly soluble to insoluble in water or organic solvents. They may be used for dyeing for example in the form in which they are produced or they may be isolated by filtration, if desired with exclusion of air and/or after treatment with acid, then washed to remove the reaction medium. In many cases the quinhydrones contain chemically combined alkali which cannot be removed by washing with water but only by treatment with acids, for instance acetic acid, formic acid or mineral acid, if desired with application of heat. This treatment often changes the color of the quinhydrone but in most cases without a recognizable change of crystalline form.

The quinhydrones obtained, especially those which have been treated with acid, have considerable stability. In spite of their crystalline condition they can be vatted even without mechanical pretreatment, such as grinding, extraordinarily easily and in this respect present substantial advantage as compared with the parent vat dyestuffs. In consequence of their affinity for vegetable and animal fibres, the quinhydrones may be used with advantage in all dyeing processes in which the non-reduced dyestuff is brought onto the fiber previous to the vatting.

The quinhydrones by long standing in, for example, alkaline aqueous suspension, or by heating such a suspension, if desired with access of air or in presence of an oxygen agent, may be changed in such a manner that at least part of the vat dyestuff is regenerated and precipitated in very finely subdivided state very suitable for dyeing purposes.

The following examples illustrate the invention, the parts being by weight:

*Example 1*

5 parts of leuco-thio-indigo are dissolved at 60–65° C. in 100 parts of alcohol. By introducing air while stirring the quinhydrone is precipitated in the form of violet-black crystals. After cooling and filtering the crystals are washed with alcohol and dried. There are obtained 4.7 parts of a violet-black sandy crystalline powder soluble in concentrated sulfuric acid to a green solution and dyeing cotton in a yellowish green vat rose tints typical of thio-indigo.

When the crystalline powder is heated with water to which a little caustic soda lye has been added the quinhydrone is split, that is to say there is produced a suspension of thioindigo in the vat solution of this dyestuff. In spite of its undoubted crystalline condition the violet-black quinhydrones can be vatted by means of hydrosulfite and caustic soda lye very quickly and completely.

*Example 2*

1 part of leuco-thio-indigo is dissolved in an atmosphere of hydrogen in 100 parts of glacial acetic acid at 60–65° C. By adding by drops a solution of sodium bichromate in acetic acid of 70 per cent strength the originally red thio-indigo is transiently reproduced. If, however, the proportion of chromic acid is so selected that there is added ½ atom of oxygen per 1 mol leuco-thio-indigo, there is obtained a product which agrees fully with that described in Example 1, namely the violet-black quinhydrone.

Instead of a sodium bichromate solution there may be used another oxidizing agent, for instance a solution of potassium permanganate in acetic acid of about 70 per cent strength.

*Example 3*

Into a solution prepared in an atmosphere of hydrogen at 110–115° C., of 16 parts of leuco-thio-indigo in 800 parts of chlorobenzene there are stirred 14 parts of thio-indigo. After heating for 8 hours at 110° C. in an atmosphere of hydrogen the whole is allowed to cool to about 60° C. and filtered; the violet-black crystalline quinhydrone (28–29 parts) on the filter is washed with chlorobenzene and dried. It agrees fully in properties with the product described in Example 1.

That the violet-black crystalline product is in fact a quinhydrone-like addition compound of leuco-thio-indigo and thio-indigo in the relation 1:1 is proved, for example, by its reduction with nickel and hydrogen. In comparison with thio-indigo there is consumed for complete conversion into the leuco-compound only half as much hydrogen.

*Example 4*

Into a solution bearing an atmosphere of hydrogen at a raised temperature of 16 parts of leuco-6:6'-diethoxy-thio-indigo in a mixture of 400 parts of alcohol, 450 parts of water and 35 parts of caustic soda lye of 30° Bé. there is introduced a suspension made by grinding together 8 parts of 6:6'-diethoxy-thio-indigo and 80 parts of alcohol and finally 190 parts of caustic soda lye of 30° Bé. are added. There is immediately formed a dark brown addition product. After stirring for ½ hour in an atmosphere of hydrogen at 65–70° C., the whole is cooled to about 20° C. and filtered; for removing the excess of leuco-compound which has not entered into reaction the solid matter is extracted with much water which has been freed from oxygen by boiling while introducing hydrogen and then cooling. After drying in a current of hydrogen of 70–90° C. there are obtained per 8 parts of dyestuff 16 parts of dark brown quinhydrone which may be ground to a heavy sandy powder. It dissolves to a violet solution in concentrated sulfuric acid and dyes cotton in a greenish yellow vat the orange tints characteristic of the dyeings with 6:6'-diethoxy-thio-indigo. When heated with water the product is split with formation of extremely fine flocks from the original heavy sandy product.

This brown quinhydrone contains besides the dyestuff components a small proportion of chemically bound sodium which in the splitting reaction with water gives rise to an alkaline reaction to phenolphthalein of the aqueous phase. Instead of operating with a large excess of the leuco-compound as described in this and the following examples it is also possible to use a leuco-compound and a dyestuff in molecular proportion of 1:1 in the reaction.

Example 5

After 20 parts of 4:4'-dimethyl-6:6'-dichloro-thio-indigo suspended in a mixture of 1000 parts of alcohol and 20 parts of caustic soda lye of 30° Bé. have been converted into the leuco-compound by means of a nickel catalyst and hydrogen the catalyst is removed by filtration of the solution in an atmosphere of hydrogen; into this solution there is introduced a paste made in the mill from 8 parts of 4:4'-dimethyl-6:6'-dichloro-thio-indigo, 100 parts of water and 5 parts of caustic soda lye of 30° Bé. and immediately following 350 parts of caustic soda lye of 30° Bé. are added. The originally red color of the mixture passes rapidly to brown. After stirring for ½ hour at about 70° C. in an atmosphere of hydrogen the whole is cooled, filtered, and for the purpose of removing the excess of leuco-compound which has not entered into reaction the solid matter is extracted with much cold water which has been boiled while passing through a current of hydrogen and then cooled. The somewhat reddish dark brown quinhydrone (16 parts) which, after having been dried in a current of hydrogen may be ground to a heavy sandy powder, dissolves to a reddish violet solution in concentrated sulfuric acid and dyes cotton in a greenish yellow vat the known brilliant rose tints of 4:4'-dimethyl-6:6'-dichlorothio-indigo.

The behaviour of this quinhydrone when it is split with hot water is similar to that of the product of Example 4. Titration of the alkali liberated by the splitting discloses the presence of one atom of alkali metal in the quinhydrone molecule.

Example 6

Into the solution of 16 parts of leuco-6:6'-diethoxythio-indigo made and filtered as described in Example 4 there are added 190 parts of caustic soda lye of 30° Bé. and then in an atmosphere of hydrogen a paste made by grinding 8 parts of 4:4'-dimethyl-6:6'-dichlorothio-indigo with 100 parts of alcohol. A dark brown suspension is thus formed which, after stirring for ½ hour at 70–75° C., is cooled to about 20° C., filtered in an atmosphere of hydrogen and the solid matter washed with much water, which has been freed from air by boiling with passage of hydrogen, and dried at 80–100° C. 16 parts of a brown-violet quinhydrone are obtained which may be ground to a heavy sandy powder; excess of unchanged leuco-6:6'-diethoxythio-indigo remains in the filtrate.

This quinhydrone dissolves in a solution of concentrated sulfuric acid to a violet solution and dyes cotton in a greenish-yellow vat yellowish scarlet tints. When the heavy sandy powder is split by heating it with water there is produced a finely flocculant suspension of the products, the aqueous phase giving alkaline reaction to phenolphthalein.

A quinhydrone of similar properties which dyes cotton bluish-scarlet tints is obtained in analogous manner by heating together 4:4'-dimethyl-6:6'-dichlorothio-indigo in the leuco form and 6:6'-diethoxy-thio-indigo.

Example 7

16 parts of leuco-6:6'-diethoxy-thio-indigo are dissolved as described in Example 4 and after filtration in an atmosphere of hydrogen there are added 190 parts of caustic soda lye of 30° Bé. and a paste made by grinding 8 parts of bis-2:1-naphththio-indigo with 80 parts of alcohol. After stirring for ½ hour at 70–75° C. the dark brown suspension is cooled to about 20° C., filtered in an atmosphere of hydrogen and the solid matter washed with much water which has been boiled with passage of hydrogen and again cooled; this removes the leuco-compound which has not entered into reaction, and the product may then be dried in a current of hydrogen at 80–100° C. The dark brown quinhydrone (15–16 parts) thus obtained dissolves to a blue solution in concentrated sulfuric acid and dyes cotton in an orange vat red-brown tints. By splitting the dark brown quinhydrone by heating it with water there is produced a brighter reddish brown suspension of the products on splitting.

Example 8

384 parts of 6:6'-diethoxythio-indigo and 386 parts of a leuco-compound made in usual manner from 6:6'-diethoxythio-indigo are stirred together with 3200 parts of water and 1000 parts of caustic soda lye of 30 per cent strength to produce a uniform magma; this is heated while stirring well at 75° C. until the originally orange paste has changed into a finely crystalline brown-black magma. When the reaction is complete, the mass is cooled to the ordinary temperature. The mass in this form may be used directly for preparing a stock vat and dyes cotton in a red-yellow vat pure orange fast tints.

Instead of the 6:6'-diethoxythio-indigo and the leuco-compound of 6:6'-diethoxythio-indigo used in this example, there may be used another indigoid vat dyestuff or its leuco-compound, for instance 4:4'-dimethyl-6:6'-dichlorothio-indigo; there is thus obtained a product which is vatted easily and dyes cotton in this vat similar tints to those of the corresponding parent dyestuff.

Example 9

386 parts of the leuco-compound of 6:6'-diethoxythio-indigo and 393 parts of 4:4'-dimethyl-6:6'-dichlorothio-indigo are stirred with 3200 parts of water and 1000 parts of caustic soda lye of 30 per cent strength to produce a uniform magma; the mass is then heated while stirring well to 75° C. and maintained at this temperature until the originally red mass has changed into a finely crystalline brown-black magma. When reaction is complete, the whole is cooled to the ordinary temperature. The mixture may be used in this form directly for preparing a stock vat. It dyes cotton in a red-yellow vat pure scarlet tints.

Example 10

384 parts of 6:6'-diethoxythio-indigo are stirred with 800 parts of water and 200 parts of caustic soda lye of 30 per cent strength to form a uniform magma; after addition of 110 parts of sodium hydrosulfite (about 80 per cent strength) and while thoroughly stirring, the whole is heated to 75° C. and kept at this temperature until the originally orange mass has become a uniform finely crystalline brown magma; this happens after 2-3 hours. When the reaction is complete, the mass is cooled to ordinary temperature.

This mixture, which shows a trace of alkalinity to phenolphthalein, may be used directly for preparing a stock vat; it dyes cotton fast orange tints.

The reaction occurs substantially more quickly if in this example an excess of caustic soda lye, for instance 260 parts, is used. In this case the alkaline mixture obtained is somewhat darker in color than that described above.

If the mixtures obtained according to this example, are mixed at 15-20° C. with hydrochloric acid until the reaction is neutral or feebly acid, the colour changes after some time, which may be shortened by gentle heating, to red-orange, and there is obtained by filtering, washing and drying a red product that dyes cotton in a vat fast orange tints.

Example 11

40.6 parts of the dyestuff obtained by condensation of 4:5-dichloro-7-methoxyisatin-α-chloride and 4-chloro-1-hydroxynaphthalene are made into a paste with 150 parts of caustic soda lye of 30 per cent strength and water and after the addition of 11 parts of sodium hydrosulfite of about 80 per cent strength the paste is heated to 70-80° C. After the suspension has been stirred for some minutes at this temperature it is cooled, filtered and the solid matter washed with water. This product is a brown-black powder soluble in concentrated sulfuric acid to a blue-green solution and dyeing cotton in a yellowish-green vat pure blue tints. It is oxidized when heated or allowed to stand for a long time in the air.

A product having similar properties is obtained when there are used as parent material 49.5 parts of the dyestuff obtained by condensing 4-chloro-5-bromo-7-methoxyisatin-α-chloride with 4-bromo-1-hydroxynaphthalene.

Example 12

384 parts of 6:6'-diethoxythio-indigo and 386 parts of a leuco-compound of 6:6'-diethoxythio-indigo made in the usual manner are stirred to form a uniform magma with 3200 parts of water and 1000 parts of caustic soda lye of 30 per cent strength; this mixture is heated while stirring well to 75° C. at which temperature it is maintained until the originally orange paste has become a fine crystalline brown-black magma, which occurs in about 30 minutes. When the reaction is complete, the mass is cooled at the ordinary temperature and then neutralized with 340 parts of isobutyric acid. The product is vatted in this pasty form very easily and dyes cotton in a red-yellow vat pure orange fast tints.

The paste may also be dried preferably in the vacuum or in an atomiser, whereby a powder is obtained which is also suitable for dyeing.

The 340 parts of isobutyric acid named in this example may be exchanged for an equivalent quantity of another acid, for instance sulfuric acid, hydrochloric acid, acetic acid or the like. However, it is of especial advantage that the acid used should lead to the formation of salts having hydrotropic properties. Such neutralised dyestuff pastes are suitable especially for dyeing by the padding method.

Example 13

21 parts of flavanthrene (Colour Index No. 1118) are suspended in a mixture of 700 parts of alcohol, 150 parts of water and 50 parts of caustic soda lye of 10 per cent strength, and the suspension is shaken in the presence of a nickel catalyst with hydrogen until the absorption of hydrogen amounts to 1 mol per 1 mol of flavanthrene. After removing the catalyst by filtration at 35-40° C. in an atmosphere of hydrogen, there is added to the deep violet-blue solution of the dihydroflavanthrene a dyestuff paste made from 10 parts of flavanthrene and 100 parts of alcohol, whereupon the whole is heated for ½ hour at 70-75° C. while stirring, then cooled to 40-45° C. and filtered with suction in an atmosphere of hydrogen; the solid matter is washed with much air-free water and dried at 80-100° C. There are obtained 21 parts of a brown quinhydrone besides unchanged dihydroflavanthrene which has not taken part in the reaction and is in the filtrate. The quinhydrone dissolves in concentrated sulfuric acid to an olive-green solution and dyes cotton in a dark blue violet vat yellow tints. When heated with water it is split, the sandy brown powder gradually becoming a finely flocculant yellow suspension. By stirring the brown quinhydrone, which has been washed free from alkali and then covered with dilute hydrochloric acid, with hydrochloric acid of 1 per cent strength in an indifferent atmosphere, for instance one of hydrogen, at 50-60° C., the suspension becomes green without changing the crystalline form characteristic of the quinhydrone.

Example 14

23 parts of dibenzanthrone are converted into the dihydro-compound in the manner described in Example 13 in the presence of nickel catalyst. After filtering the catalyst there is introduced in an atmosphere of hydrogen into the dark reddish violet solution a dyestuff paste made by grinding 10 parts of dibenzanthrone with 100 parts of alcohol and the whole is stirred for ½ hour at 70-75° C. The suspension cooled to 40° C. is then filtered with suction and the solid matter washed with air-free water and dried in a current of hydrogen at 80-100° C. There are obtained 20 parts of a brown-black quinhydrone which, when rubbed shows a crystalline fracture of bronze lustre, in addition to unchanged dihydrodibenzanthrone which is in the filtrate. The quinhydrone dissolves to a violet solution in concentrated sulfuric acid and dyes cotton in a violet vat reddish blue tints.

Example 15

20 parts of 4:5:4':5'-dibenzothio-indigo are suspended in 500 parts of alcohol, and after addition of 50 parts of caustic soda lye of 10 per cent strength converted into the leuco-compound by shaking with hydrogen in presence of a nickel catalyst. The solution freed from catalyst by filtration in an atmosphere of hydrogen is mixed with 60 parts of caustic soda lye of 30 per cent strength and then stirred at 65-70° C. for ½ hour in an atmosphere of hydrogen with a paste made from 10 parts of 4:5:4':5'-dibenzothio-indigo, 50 parts of alcohol and 50 parts of water.

The suspension becomes black. After cooling to about 25° C. and filtering the solid matter is washed in an atmosphere of hydrogen with boiled water and dried at 90–100° C. The black sandy powder thus obtained dissolves in concentrated sulfuric acid to a blue-green solution and dyes cotton in an orange vat pure brown tints.

By stirring the black quinhydrone, washed free from alkali and covered with dilute hydrochloric acid, with hydrochloric acid of 1 per cent strength at 70–75° C. in an atmosphere of hydrogen the colour of the suspension becomes lighter without the product losing the properties characteristic of the quinhydrone.

Example 16

After converting 15 parts of 5:5′:7:7′-tetrabromindigo suspended in a mixture of 500 parts of alcohol, 300 parts of water and 14 parts of caustic soda lye of 30° Bé., into the leuco-compound by treatment with hydrogen in the presence of nickel catalyst and removing the catalyst by filtration in an atmosphere of hydrogen there is introduced into the solution a fine suspension of 10 parts of 5:5′:7:7′-tetrabromindigo in 90 parts of alcohol. After stirring for about ½ hour and heating to 60–70° C. in an atmosphere of hydrogen, the mixture becomes black. After cooling to 25° C. the whole is filtered and for separating the excess of leuco-compound which has not entered into reaction the solid matter is washed with much boiled water and dried in a current of hydrogen at 90–100° C. The feebly greenish-black sandy quinhydrone dissolves to a greenish blue solution in concentrated sulfuric acid and dyes cotton in a green-yellow vat pure blue tints. In spite of the sandy crystalline character of the product, the latter is vatted very easily.

Example 17

2.5 parts of the dyestuff preparation obtained as described in Example 5 are made into a paste with 20 parts of caustic soda lye of 33 per cent strength. There are then added 250 parts of water at 70–80° C. and 10 parts of sodium hydrosulfite and the whole is allowed to stand for 10 minutes and then diluted to 2000 parts with water. There are now entered 100 parts of cotton at 60° C. and after about 10 minutes 50 parts of common salt are added; dyeing is continued for a further ½ hour at 60° C. and the goods are then washed and soaped. The cotton is dyed brilliant rose tints. For wool, silk and artificial silk obvious variations of the dyeing process will be required.

What we claim is:

1. The product built up from molecules of a vat dyestuff and a leuco compound of a vat dyestuff, which product represents a definite compound constituting an equimolecular combination of the vat dyestuff and the leuco compound differing from the vat dyestuff as well as from the leuco compound.

2. The product built up from molecules of a vat dyestuff and its leuco compound, which product represents a definite compound constituting an equimolecular combination of the vat dyestuff and its leuco compound differing from the vat dyestuff as well as from the leuco compound.

3. The product built up from 6:6′-diethoxy-thioindigo and its leuco compound, which product represents a definite compound constituting an equimolecular combination of the 6:6′-diethoxy-thioindigo and its leuco compound, being a crystalline red powder which dyes cotton pure orange tints from a red-yellow vat.

EDUARD KAMBLI.
ERNST STOECKLIN.
RICHARD TOBLER.